United States Patent [19]

Tecza

[11] Patent Number: 5,121,819
[45] Date of Patent: Jun. 16, 1992

[54] SEGMENTED POROUS DAMPER

[75] Inventor: Joseph A. Tecza, Guilderland, N.Y.

[73] Assignee: The United States of America as represented by the Secretary of the Air Force, Washington, D.C.

[21] Appl. No.: 479,784

[22] Filed: Feb. 13, 1990

[51] Int. Cl.⁵ .................. F16F 9/14; F16D 57/02
[52] U.S. Cl. .................... 188/306; 188/296
[58] Field of Search ............. 188/264 E, 290, 293, 188/296, 322.5, 306; 16/82

[56] References Cited

U.S. PATENT DOCUMENTS

| | | | |
|---|---|---|---|
| 1,149,938 | 8/1915 | Nagelvoort | 188/290 |
| 2,445,573 | 7/1948 | Godbe, Jr. | 188/293 X |
| 3,865,216 | 2/1975 | Gryglas | 188/290 |
| 3,991,818 | 11/1976 | Wagner | 165/8 |
| 4,098,597 | 7/1978 | Nebelung | 188/306 X |
| 4,323,145 | 4/1982 | Allen | 188/322.11 |
| 4,639,146 | 1/1987 | Yoshioka et al. | 384/99 |
| 4,643,592 | 2/1987 | Lewis et al. | 384/100 |
| 4,768,630 | 9/1988 | Aubry et al. | 188/296 X |
| 4,908,905 | 3/1990 | Kanno et al. | 188/290 X |

FOREIGN PATENT DOCUMENTS 284873  8/1952  France ............. 188/290

OTHER PUBLICATIONS

D. L. Taylor et al, "Analysis and Design of Segmented Dampers for Rotor Dynamic Control," Trans. of the ASME, vol. 104, pp. 84–90, Jan. 1982.
S. T. Bhat et al, "Analysis of High Load Dampers," NASA, CR-165503, Aug. 1981.
J. Prakash et al, "An Analysis of the Squeeze Film Between Rough Porous Rectangular Plates with Arbitrary Porous Wall Thickness," Trans. of ASME, Journal of Tribology, vol. 106, pp. 218–221, Apr. 1984.
C. Cusano et al, "Transmissibility Study of a Flexibly Mounted Rolling Element Bearing in a Porous Bearing Squeeze-Film Damper," Trans. ASME, Journal of Lubrication Technology, Jan. 1977, pp. 50–56.

Primary Examiner—Robert J. Oberleitner
Assistant Examiner—Josie A. Ballato
Attorney, Agent, or Firm—Irwin P. Garfinkle; Donald J. Singer

[57] ABSTRACT

A damper system is disclosed in which is provided a segmented damper for damping the vibrations of a rotating shaft, the damper comprising a sealed porous fixed normally concentric cylinder surrounding the shaft, the space between the porous cylinder and the shaft being axially segmented by radial walls extending parallel to the axis of the shaft, the segmented space being filled with a fluid which is driven through the pores of said cylinder when said shaft vibrates to provide linear dampling.

2 Claims, 1 Drawing Sheet

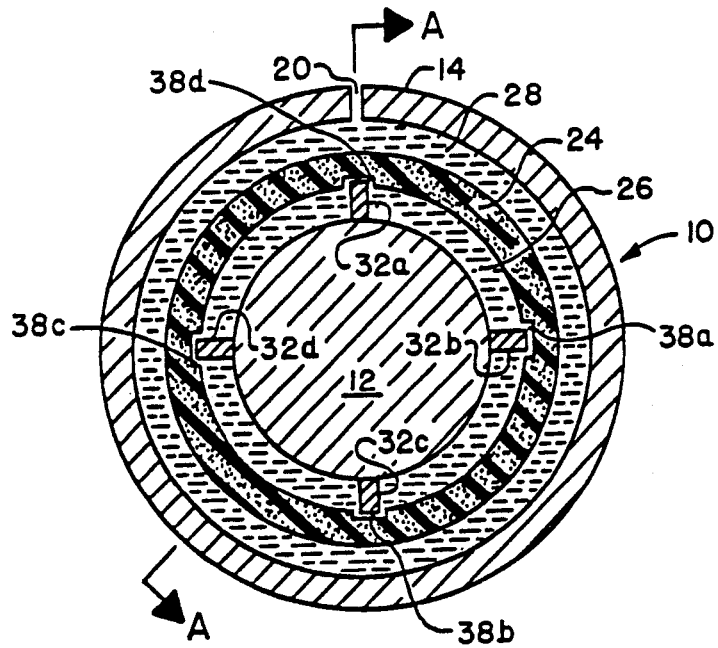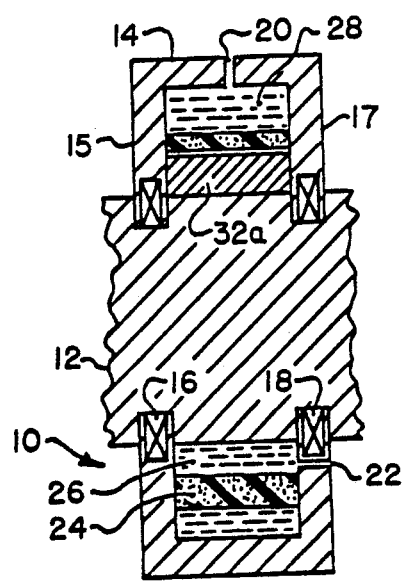

SEGMENTED POROUS DAMPER

STATEMENT OF GOVERNMENT INTEREST

The invention described herein may be manufactured and used by or for the Government for governmental purposes without the payment of any royalty thereon.

BACKGROUND OF THE INVENTION

With the trend in advanced turbine engine design toward lighter weight and higher performance, more flexible rotordynamic systems have evolved. The increased rotor flexibility and resultant component design changes have resulted in rotordynamic systems which are more responsive to imbalance. For this reason improved damper systems are required to control vibrations resulting from levels of imbalance up to five times the presently designed for levels.

Conventional squeeze film dampers, which are designed to control nominal levels of imbalance excited vibrations, are not necessarily effective in controlling the high levels of imbalance associated with events such as foreign object damage and blade loss in gas turbine engines. This becomes even more of a problem with advanced rotor designs where continuous operation under levels of imbalance up to five times their present levels may be expected. In accordance with this invention a segmented porous damper is provided in which damper energy absorption is essentially viscous and, hence, nearly linear throughout the entire range of expected vibrations. Thus, this invention eliminates the amplitude dependence of the squeeze film damper and the combined frequency/amplitude dependence resulting from orifice flow mechanisms, and results in linear, viscous damping with no cross coupling or inertia effects.

THE PRIOR ART

The most relevant known prior art appears in a paper published by Taylor and Fehr in the Transactions of the ASME, Page 84 et sec, Vol. 104, January 1982. Taylor and Fehr disclose a segmented damper for use in the control of shaft vibrations of rotating equipment which must operate through one or more critical speeds As disclosed in that paper, a series of isolated segments of fluid are used rather than a continuous film as in the then traditional squeeze film dampers Taylor and Fehr claimed that the disclosed segmented damper provided energy dissipation through fluid viscosity within the film segments and through orifice flow in the supply and exit ports for each segment, and that the damping force was linear for a wide range of operating conditions, speed and imbalance.

The damper described by Taylor and Fehr uses the annular gap between a damper housing and a curved beam type bearing support to generate a damping force. This damper has a series of circumferential segments separated by axial baffles. There is a relatively small clearance between the beam and the damper housing and the latter is penetrated at each segment location by two sets of ports: Inlet ports, which are fairly large and contribute to the operation of the damper, and Outlet ports, which are small and are present only to ensure filling of the damper. The major source of damping in the device is derived from the squeezing of the damper fluid as it flows in the gap between the beam and the housing, and then into the supply port. The supply port is modeled as a linear flow resistance by means of a linear flow coefficient, and a portion of the damping force is also a result of the pressure drop across this port.

Taylor et al claim that the damper responds nearly linearly, based on an analysis of the flow in the annular gap. However, analysis shows that there are two strong non-linearities that will appear at medium to large vibration amplitudes. The first non-linearity results from the fact that the supply port behaves as an orifice so that part of its pressure drop is due to the viscous fluid flow (linear) and part is due to the inertia of the fluid as it flows through the port. This "Bernoulli" term is proportional to the square of the fluid velocity and its effect on the damping is to the first power. Note that linear damping behavior should have the damping force be the product of a constant damping coefficient and velocity. However, if the Bernoulli term is large, the damping coefficient becomes dependent on velocity and therefore the force is a function of the square of the velocity.

The second source of non-linearity is more subtle. If the supply port diameter is much larger than the annular gap, the port's area is not the major restriction to the flow of the damper fluid. Rather, it is the "curtain" area between the edge of the hole and the curved beam, which is the product the supply hole circumference and the radial clearance in the oil film. This area varies with time as the rotor vibrates, with the effect becoming larger as the supply port location moves toward the center of the beam (where the motion is greatest). Therefore, even a linear flow coefficient would decrease as amplitude increases and this will result in some degree of nonlinear damper behavior.

A number of prior art patents were reported in a search of the prior art. U.S. Pat. No. 4,323,145 disclosed a damping system for damping audio frequency sound waves, and for that purpose used a porous audio absorbing material. U.S. Pat. No. 3,991,818 disclosed a damping system which relies on the viscous shearing of a thin film of oil between the rotating member and a hub. U.S. Pat. No. 4,639,146 shows a thrust bearing that incorporates a squeeze film damper for absorbing oscillations. U.S. Pat. No. 4,643,592 discloses a computerized system for "jumping over" and "running through" critical speeds and thereby avoiding the need for damping.

SUMMARY OF THE INVENTION

Like the curved beam damper, the segmented porous damper disclosed herein uses circumferential chambers which pump a fluid to generate a damping force. However, this damper does not generate any significant flow in the annular gap between the damper journal and the ring housing the porous elements. In fact, this gap is set at a large value to allow for large amplitude rotor vibration. All of the pressure drop, which generates the damping force, comes from the flow of damper fluid through a series of fluid passages, which can be tortuous (e.g. a sintered metal filter element) or straight (a series of small diameter holes). The pressure generated by the flow through each of these holes has two components, a linear viscous component, and an inertial component. The design recognizes this and the device is linearized by making the diameter of the holes small enough (with a length much greater than their diameter) so that the pressure drop due to the viscous flow loss is much greater, perhaps by a factor of ten, than that from the inertial loss. This is accomplished by specifying the length of the holes (or pores), then determining the number required to minimize nonlinear behavior at the largest foreseeable rotor amplitude. Given this number, the hole diameter can be sized to yield the correct amount of damping, and the behavior of the damper will be very nearly linear throughout the speed/amplitude operating envelope In summary, while both the curved beam damper disclosed by Taylor and Fehr and chambered porous damper of this invention, can be considered segmented dampers, they have different operating principles. The Taylor and Fehr curved beam damper generates damping forces by squeezing fluid between two plates and then through a supply port. The chambered porous damper disclosed herein generates essentially all of its force by means of fluid flow through a series of capillary tubes. These force the pressure drop to be predominantly linear because the low net fluid velocity through each tube results in a pressure drop dependent only on flow volume, fluid viscosity and tube geometry.

OBJECTS OF THE INVENTION

It is an object of this invention to provide a damper which more effectively attenuates abusive imbalance loads without sacrificing the ability to control vibrations under normal conditions.

Another object of this invention is to provide a segmented damper for damping the vibrations of a rotating shaft, wherein the damper comprises a porous fixed normally concentric sealed cylinder surrounding the shaft, the space between the porous cylinder and the shaft being filled with a fluid, the fluid being driven through the pores of said annulus when the shaft vibrates, whereby the vibrations of the shaft are damped linearly.

Another object of this invention is to provide a segmented damper for damping the vibrations of a rotating shaft, wherein the damper comprises a porous fixed normally concentric sealed cylinder surrounding the shaft, the space between the porous cylinder and the shaft being segmented and filled by a fluid, the fluid being driven through the pores of the porous cylinder when the shaft vibrates, whereby the vibrations of the shaft are damped linearly Another object of this invention is to provide a segmented damper for damping the vibrations of a rotating shaft, wherein the damper comprises a sealed porous fixed normally concentric cylinder surrounding the shaft, the space between the porous annulus and the shaft being segmented by radial walls extending parallel to the axis of the shaft, the segmented space being filled with a fluid which is driven through the pores of said cylinder when said shaft vibrates, whereby the vibrations of said shaft are damped linearly.

Another object of this invention is to provide a damper in which motion of the system being damped forces a fluid through a medium containing many capillaries or pores, which resist passage of that fluid. The resistance is the result of viscous losses and results in a differential pressure across the medium, resisting motion.

BRIEF DESCRIPTION OF THE DRAWINGS

For a more detailed description of the invention, reference should now be made to the following detailed specification and to the accompanying drawing in which FIG. 1 is a cross section of an exemplary embodiment of the invention showing the segmented porous damper mounted on a rotor shaft or journal; and FIG. 2 is a cross section of the damper taken through the line A—A in FIG. 1.

DETAILED DESCRIPTION OF A PREFERRED EMBODIMENT

A preferred form of the invention is shown in FIGS. 1 and 2 where a damper generally indicated at 10, is used for damping the oscillations of a shaft 12 which comprises both the rotating shaft and a bearing. The shaft 12 is supported within a cylindrical housing 14, having end walls 15 and 17 which contain circumferential seals 16 and 18, respectively. An oil inlet 20 is provided for admitting oil under pressure to the interior of the housing 14, and a oil outlet 22 permits the outflow of oil from the housing to maintain the fluid in the housing cool.

The damper for the system comprises a porous cylinder 24 which surrounds the shaft and provides an inner annular chamber surrounding the shaft 12, and an outer annular chamber 28. The inner chamber 26 is segmented into 4, 90 degree segments by means of a plurality of radial baffles 32a-d, which extend axially between the ends 15 and 17 of the housing 14, and which are held in place in notches 38a-d, respectively in the inner wall of the porous cylinder 24. These notches 38a-d form a radial gap between the ends of the radial baffles 32a-d and the porous cylinder 24.

The inner and outer chambers 26 and 28 are both sealed. As the shaft 12 precesses, or oscillates, fluid is forced out of the 90 degree segments of the chamber 26 through the porous cylinder 24 and back into the other chamber segments. The system is designed so that the leakage past the baffles 32a-d is minimized, but sufficient space is provided between cylinder 24 and the shaft 12 to accommodate anticipated shaft vibration. Thus essentially all of the damping results from the passing of the oil through the pores of the porous cylinder 4, and only viscous losses, which are essentially amplitude and frequency independent, generate the damping.

The porous medium of the cylinder 24 may be sintered metal particles or a metal filter element, or it may be a plate with a large number of small diameter holes drilled through it or a series of drilled inserts For a given set of conditions, the number of capillaries per unit area and their sizing are calculated such that flow within the capillaries is laminar, turbulent losses are negligible, and damper static pressure (the pressure in the fluid within the damper) is large enough to preclude cavitation. With these conditions satisfied, damping will be essentially purely viscous and linear.

It will be recognized by person skilled in the art that the foregoing invention is subject to various modifications and adaptations. For example, the damper may have more or less segments, and it may b Ⓡconstructed Of different materials. It is essential that the length of the pores or capillaries be much larger than the diameters in order to obtain linearity over substantially the entire range of anticipated oscillations or vibrations. It is intended therefore that this invention be limited only by the following appended claims as interpreted in the light of the prior art.

What is claimed is:

1. A damping system for damping the vibrations of a shaft rotating on its axis, the combination comprising:

a stationary cylindrical housing;

the axis of said shaft being rotatably supported within said cylindrical housing on the axis of said housing, a stationary porous cylinder co-axial with said shaft and said housing, said porous cylinder being positioned intermediate said housing and said shaft and thereby dividing the space surrounding said shaft into radially spaced inner and outer chambers, said inner and outer chambers being substantially sealed from one another except through the pores of said porous cylinder, said pores being capillary-sized;

a plurality of axially extending radial walls in said inner chamber, said radial walls extending between said shaft and said porous cylinder and dividing said inner chamber into a plurality of axially extending radial segments, a radial gap between said walls and said porous cylinder, said gap being provided to accommodate anticipated vibrations of said shaft;

a fluid filling both of said chambers, whereby radial vibrations of said shaft forces said fluid back and forth through the pores of said porous cylinder, and whereby linear damping of the vibrations of said shaft over a wide range results.

2. The system as defined in claim 1 and an inlet and an outlet for admitting and removing fluid from said chambers to maintain the fluid in said housing cool.

* * * * *